Aug. 15, 1933.          R. C. BOTSFORD          1,922,877
PRUNING TOOL
Filed Jan. 20, 1932
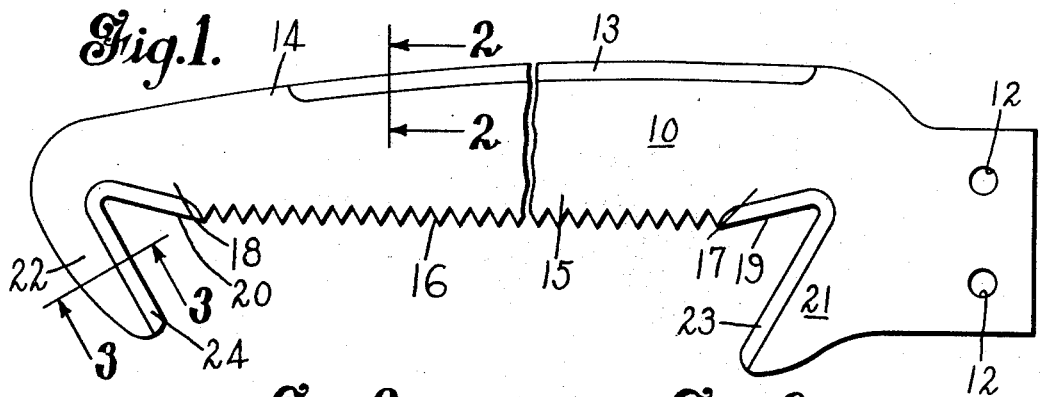
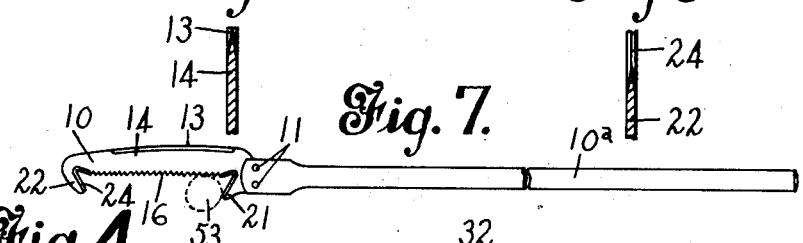
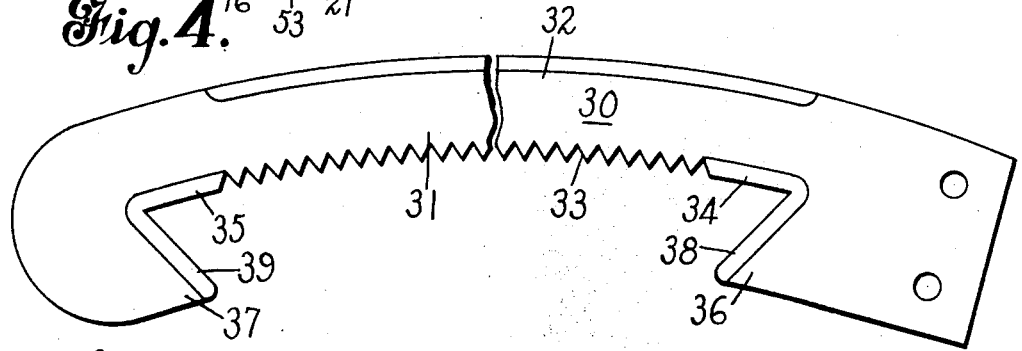
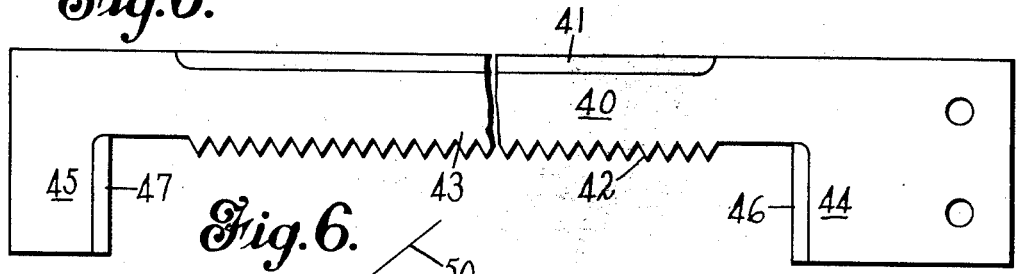
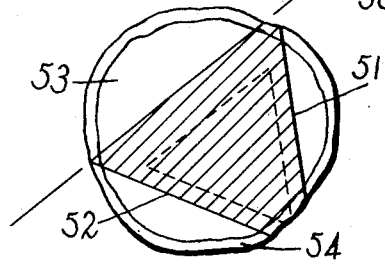
Inventor
Robert C. Botsford
By Rockwell & Bartholow
Attorneys Patented Aug. 15, 1933

1,922,877

UNITED STATES PATENT OFFICE 1,922,877

PRUNING TOOL

Robert C. Botsford, New Haven, Conn.

Application January 20, 1932. Serial No. 587,653

9 Claims. (Cl. 30—11)

This invention relates to pruning tools and more particularly to pruning tools adapted for use in trimming or pruning branches from trees. This invention contemplates an improvement in such tools whereby branches may be severed from trees more rapidly and with less damage to the tree than has heretofore been possible.

The general practice of pruning trees in the past, especially in forests, has been to knock or cut off the smaller and lower branches with an axe and the higher branches either with an axe or a saw. The use of a pruning saw of the usual type, while preferable over an axe in some instances, is time consuming and, therefore, wherever a great many trees require pruning as in a forest, an axe is generally used by the forester. The use of an axe is many times detrimental to the tree, for while cutting the branch the tree trunk is often struck and seriously damaged. By the use of either a saw or an axe, the branch, in many instances, is broken from the tree before it is sufficiently cut away therefrom, and bark is stripped from the tree trunk when the branch falls, which results in a wound of large area into which disease and insects may enter and ruin the tree for lumber purposes. By removing a branch in such a manner that the area of the wound is of minimum size and no damage results to the rest of the tree, faster healing results, and the detrimental effect of the elements upon the uncovered interior of the tree is greatly diminished.

This invention has for one of its objects the provision of a tool whereby branches may be removed from trees more expeditiously than heretofore and which will insure that a minimum area of the tree interior will remain exposed to the elements, insects and disease.

Another object of this invention is to provide a tree pruning tool by which branches may be rapidly removed by sawing and no stripping of bark or other mutilation of the tree will result.

Still another object is to provide a tree pruning saw structure having means to substantially simultaneously saw or cut into the undersurface of the branch while sawing or cutting into the upper surface of the same.

A further object is to provide in a tree pruning saw structure means to abruptly and forcefully strike the branch being sawed or cut, transversely of the cut to sharply break the uncut portion of the branch from the tree before it is sufficiently cut through to break off by its own weight.

A still further object is to provide a tree pruning saw with means to limit the longitudinal movement of the saw and thus prevent the cutting blade from being inadvertently withdrawn from the cut.

To these and other ends, the invention consists in the novel features and combinations of parts to be hereinafter described and claimed.

In the accompanying drawing:

Fig. 1 is a side view of a tree pruning tool embodying the features of this invention, the drawing being broken to indicate additional or varying length of blade;

Fig. 2 is a section on line 2—2 of Fig. 1;

Fig. 3 is a section on line 3—3 of Fig. 1;

Fig. 4 is a modified form of pruning saw blade;

Fig. 5 is another modified form of tree pruning saw blade;

Fig. 6 is a sectional view of a branch showing the operation of the pruning tool of this invention thereon, and Fig. 7 is a view showing the preferred form of blade secured to a handle and its relation to a branch to be cut.

The pruning tool generally comprises a blade 10 which may be of any suitable and desired length. Generally, the blade 10, by means of bolts or rivets 11 passing through openings 12, is secured to a long wooden handle 10ª, see Fig. 7, for reaching up into trees, but any preferred type or length of handle may be used. The blade 10 is preferably made of heavy stock and hardened sheet steel and is provided with a cutting edge 13 upon its upper or rear edge 14. The lower or front edge 15 is provided intermediate its ends with a comparatively long series of saw teeth 16, the length of the series being sufficient to permit the use of the tool upon comparatively small branches, for instance, three inches or less in diameter. For such size branches, the length of the series should be at least twelve to fifteen inches and for larger branches the series of teeth should be proportionately longer. The front edge 15 is undercut at each end of the series of saw teeth 16 and the other rearwardly inclined edges 17 and 18 formed thereby are sharpened to provide cutting edges 19 and 20, respectively.

Shoulders 21 and 22 are provided, one at each end of the saw toothed edge 15. The shoulders 21 and 22 extend outwardly and forwardly away from edge 15 an amount sufficient to insure that they will strike the branch being cut at a point substantially 90° about its periphery from the point of first contact of the saw teeth therewith. In tools made for cutting branches three inches in diameter the shoulders may be about one and one-half to two inches long and proportionately longer for branches of larger diameter. Preferably, the opposing edges 23 and 24 of shoulders 21 and 22 respectively, are sharpened to provide cutting edges, and are inclined from the inner extremities of the edges 17 and 18 respectively, outwardly and toward each other and over the toothed edge 15.

In the modified form shown in Fig. 4, the blade 30 is curved and the toothed edge 31 is substantially parallel with the upper or rear edge 32. In this form, the portion of the saw-toothed edge 31 at each end of the series of teeth 33 is not undercut but continues in line therewith, being sharpened to form cutting edge portions 34 and 35. Shoulders 36 and 37 are provided and are inclined outwardly toward each other as in the preferred form described above and have the opposing edges 38 and 39 thereof sharpened to provide cutting edges.

In the form shown in Fig. 5, the blade 40 is provided with a cutting edge 41 upon its rear or upper edge and with saw-teeth 42 upon its front or lower edge 43. The shoulders 44 and 45 in this form are disposed substantially at right angles to the toothed edge 43. The opposing edges 46 and 47 of shoulders 44 and 45 respectively, are sharpened to present cutting edges.

The above described forms of pruning tool may all be used to rapidly sever branches from trees without causing serious damage to the tree. While drawing the blade back and forth during the action of sawing, the end shoulders alternately strike the branch and act as stops to retain the blade against being drawn entirely through and out of the cut. Simultaneously with the blade retaining action, the cutting edges provided upon the shoulders cut into the sides of the branch and assist in rapidly severing it from the tree. After partially sawing through the branch and due to the cutting action of the edges provided on the shoulders also cutting into the branch, the same is weakened to such an extent that a sharp blow thereon by either shoulder will break it away from the tree much sooner than the branch would have broken away had it been merely sawed. Due to this saving in time, a forester will be able to prune a large number of trees in a minimum length of time.

By inclining the cutting edges of the shoulders toward each other, the cutting action thereof is such that the bark underneath the branch is severed substantially at the first forward stroke of the blade, and should the branch break away from the tree at any time during the cutting operation, the bark of the tree below the branch will not be stripped therefrom and cause the exposure of a large area of the interior of the tree. Undercutting the blade portion at each end of the saw teeth prevents the possibility of the branch wedging into the corner formed by the shoulder and the toothed edge.

The above operations are illustrated in Fig. 6, wherein 50 is the line of saw cut and 51 and 52 are the cuts made by the cutting edges of the respective inclined shoulders. Assuming that the branch 53 is extending horizontally, and is sawed at the upper surface on a slant, the bark at the lower part of the branch at 54, and which is normally joined to the bark of the tree at this point, will be severed during the first few upward strokes of the blade by cutting edge 23. After repeated strokes all three cuts will become deeper, as shown in dotted lines in Fig. 6, until the branch may be readily broken away by a sharp blow by either shoulder. The provision of the cutting edge upon the upper or rear edge of the blade permits its use as a hatchet to clear or cut away branches or brush too small to saw.

In using the blade shown in Fig. 5, the knife cuts will extend at right angles to the bottom of the saw kerf instead of at acute angles thereto.

While I have shown and described some preferred embodiments of my invention, it will be understood that it is not to be limited to the details shown but is capable of modification and variation within the spirit of the invention and the scope of the appended claims.

What I claim is:

1. A pruning tool comprising a blade having a series of saw teeth formed on one edge thereof, a knife-like cutting edge upon said blade at each end of said series of saw teeth, and a shoulder extending outwardly from said toothed edge and at each end thereof.

2. A pruning tool comprising a blade having a series of saw teeth formed on one edge thereof, and a shoulder extending outwardly away from said toothed edge and at each end thereof, the opposing edges of said shoulders being sharpened to provide cutting edges.

3. A pruning tool comprising a blade having a series of saw teeth formed on one edge thereof, a knife-like cutting edge upon said blade at each end of said series of saw teeth, and a shoulder extending outwardly away from said toothed edge and disposed at the outer end of each knife-like cutting edge, the opposing edges of said shoulders being sharpened to provide cutting edges.

4. A pruning tool comprising a blade, said blade having a series of saw teeth formed along one edge thereof, and a knife-like cutting edge upon said toothed edge at each end of said series of saw teeth and extending in line therewith.

5. A pruning tool comprising a blade having a series of saw teeth formed on one edge thereof, and a shoulder extending at an obtuse angle thereto from said edge and at each end thereof, said shoulders being inclined toward each other over said toothed edge.

6. In a pruning tool, an elongated substantially thin blade having saw-like teeth formed along one of its long edges, means to reciprocate the toothed edge of said blade across the branch of a tree or the like to cause the teeth thereof to cut into the same, a shoulder extending from each end of said blade, each of said shoulders having the edge thereof facing said saw-like teeth sharpened to provide a cutting edge to alternately cut into the sides of the branch of the tree being acted upon by said teeth and at the end of each reciprocating stroke of said blade without removing the toothed edge of said blade from the cut being made thereby.

7. In a pruning tool, an elongated substantially thin blade having saw-like teeth formed along one of its long edges, means to reciprocate the toothed edge of said blade across the branch of a tree or the like to cause the teeth thereof to cut into the same, a shoulder extending at an acute angle from each end of said blade, each of said shoulders having the edge thereof facing said saw-like teeth inclined toward the other shoulder and sharpened to provide a cutting edge to alternately cut into the sides of the branch of the tree being acted upon by said teeth and at the end of each reciprocating stroke of said blade without removing the toothed edge of said blade from the cut being made thereby.

8. In a pruning tool, an elongated substantially thin blade having saw-like teeth formed along one of its long edges, and a knife-like cutting edge formed upon the same blade edge in line with the saw-like teeth thereon and at each end thereof, means to reciprocate the toothed edge of said blade across the branch of a tree or the like to cause the teeth thereof to cut into the same, a shoulder extending from the outer end of each of the knife-like cutting edges on said blade, each of said shoulders having the edge thereof facing said saw-like teeth sharpened to provide a cutting edge to alternately cut into the sides of the branch of the tree being acted upon by said teeth and at the end of each reciprocating stroke of said blade without removing the toothed edge of said blade from the cut being made thereby.

9. In a pruning tool, an elongated substantially thin blade having saw-like teeth formed along one of its long edges, and a knife-cutting edge formed upon the same blade edge in line with the saw-like teeth thereon and at each end thereof, means to reciprocate the toothed edge of said blade across the branch of a tree or the like to cause the teeth thereof to cut into the same, a shoulder extending at an acute angle from the outer end of each of the knife-like cutting edges on said blade, each of said shoulders having the edge thereof facing said saw-like teeth inclined toward the other shoulder and sharpened to provide a cutting edge to alternately cut into the sides of the branch of the tree being acted upon by said teeth and at the end of each reciprocating stroke of said blade without removing the toothed edge of said blade from the cut being made thereby.

ROBERT C. BOTSFORD.